United States Patent
Lieuwen et al.

(10) Patent No.: US 6,889,358 B1
(45) Date of Patent: May 3, 2005

(54) CONCURRENCY CONTROL IN MATERIALIZED VIEWS OF A DATABASE

(75) Inventors: Daniel Francis Lieuwen, Plainfield, NJ (US); Akira Kawaguchi, New York, NY (US); Inderpal Singh Mumick, Berkeley Heights, NJ (US); Dallan Wendell Quass, Palo Alto, CA (US); Kenneth A. Ross, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 746 days.

(21) Appl. No.: 09/004,265

(22) Filed: Jan. 8, 1998

(51) Int. Cl.[7] .............................. G06F 15/00; G06F 7/00; G06F 17/30; G06F 17/21
(52) U.S. Cl. .............................. 715/500; 707/1; 707/2; 707/8; 707/9; 707/202; 707/203
(58) Field of Search ................................ 707/1–9, 100, 707/101, 201, 202–203, 10; 715/500

(56) References Cited

U.S. PATENT DOCUMENTS

| | | | |
|---|---|---|---|
| 5,237,678 A * 8/1993 | Kuechler et al. | ............... | 707/5 |
| 5,280,612 A * 1/1994 | Lorie et al. | ...................... | 707/8 |
| 5,317,731 A * 5/1994 | Dias et al. | ...................... | 707/8 |
| 5,440,735 A * 8/1995 | Goldring | ........................ | 707/8 |
| 5,452,445 A * 9/1995 | Hallmark et al. | ............... | 707/2 |
| 5,594,899 A * 1/1997 | Knudsen et al. | ................ | 707/2 |
| 5,666,526 A * 9/1997 | Reiter et al. | .................... | 707/2 |
| 5,692,178 A * 11/1997 | Shaughnessy | ................... | 707/8 |
| 5,701,480 A * 12/1997 | Raz | ............................. | 709/101 |
| 5,832,484 A * 11/1998 | Sankaran et al. | ............... | 707/8 |
| 5,893,117 A * 4/1999 | Wang | ......................... | 707/203 |
| 5,940,827 A * 8/1999 | Hapner et al. | .................. | 707/8 |
| 5,983,225 A * 11/1999 | Anfindsen | ....................... | 707/8 |
| 5,999,930 A * 12/1999 | Wolff | ............................. | 707/8 |
| 5,999,931 A * 12/1999 | Breitbart et al. | ............... | 707/10 |
| 6,026,413 A * 2/2000 | Challenger et al. | ......... | 707/202 |
| 6,032,216 A * 2/2000 | Schmuck et al. | ........... | 710/200 |

OTHER PUBLICATIONS

Roussopoulos, Nick et al., Principles and Techniques in the Design of ADMS, Comupter [periodical], IEEE Computer Society, vol. 19, No. 12, pp.19–25, Dec. 1986.*

Griffin, Timothy et al., Incremental Maintenance of Views with Duplicates, ACM, pp. 328–339, 1995.*

Ceri, Stefano et al., Deriving Production Rules for Incremental View Maintenance, Proceedings of the 17th International Conference on Very Large Databases, pp. 577–589, Sep. 1991.*

Blakeley, Jose et al., Efficiently Updating Materialized Views, ACM, pp. 61–70, 1986.*

(Continued)

*Primary Examiner*—William L. Bashore (57) ABSTRACT

In a database, a database manager can generate a view, which, in concept, is a subset of the database, which is placed outside the database for use without disturbing the database, and without disturbance by others using the database. The subset, or view, can be understood as a collection of rows, or tuples, of data copied from the database. With views existing, multiple copies of data within the database now exist: the original in the database, and copies in the views. If one of these is changed, without corresponding changes made in the others, then inconsistencies occur, which cannot be tolerated. Under the invention, when a user seeks a lock on a view, indicating that a change may be imminent, the invention locks a superset of the tuples in the database from which the view is derived. A superset is a set which contains the set of tuples of the view, plus possibly others. Thus, more tuples are locked than strictly necessary. The excess locking is tolerated because other benefits are obtained.

18 Claims, 9 Drawing Sheets

OTHER PUBLICATIONS

Dasgupta, Partha et al., The five color concurrency contrl protocol; non–two–phase locking in general databases, ACM Transactions on Database Systems, vol. 15, Issue 2, pp. 281–307, Jun. 1990.*

Segev, Arie et al., Updating Distributed Materialized Views, IEEE Transactions on Knowledge and Data Engineering, vol. 1, No. 2, pp. 173–184, Jun. 1989.*

Segev, Arie et al., Concurrency–Based Updates To Distributed Materialized Views, IEEE Proceedings of the Sixth International Conference on Data Engineering, pp. 512–520, Feb. 1990.*

Xiaolei, Qian et al., Incremental Recomputataion of Active Relational Expressions, IEEE Transactions On Knowledge and Data Engineering, vol. 3, No. 3, pp. 337–341, Sep. 1991.*

Locking in a Relational Data Data Base, IBM Technical Disclosure Bulletin, vol. 25, Issue 10, Mar. 1983, pp. 5027–5028.*

Colby, Latha S. et al., Algorithms for deferred view maintenance, ACM International Conference on Management of Data and Symposium on Principles of Database Systems, Jun. 3–6, 1996, pp. 469–480.*

* cited by examiner

CONCURRENCY CONTROL IN MATERIALIZED VIEWS OF A DATABASE

The invention concerns a database system which provides multiple views of the database. The system assures that, when a user reads views, consistent data is delivered to the user.

BACKGROUND OF THE INVENTION

Figure 1:
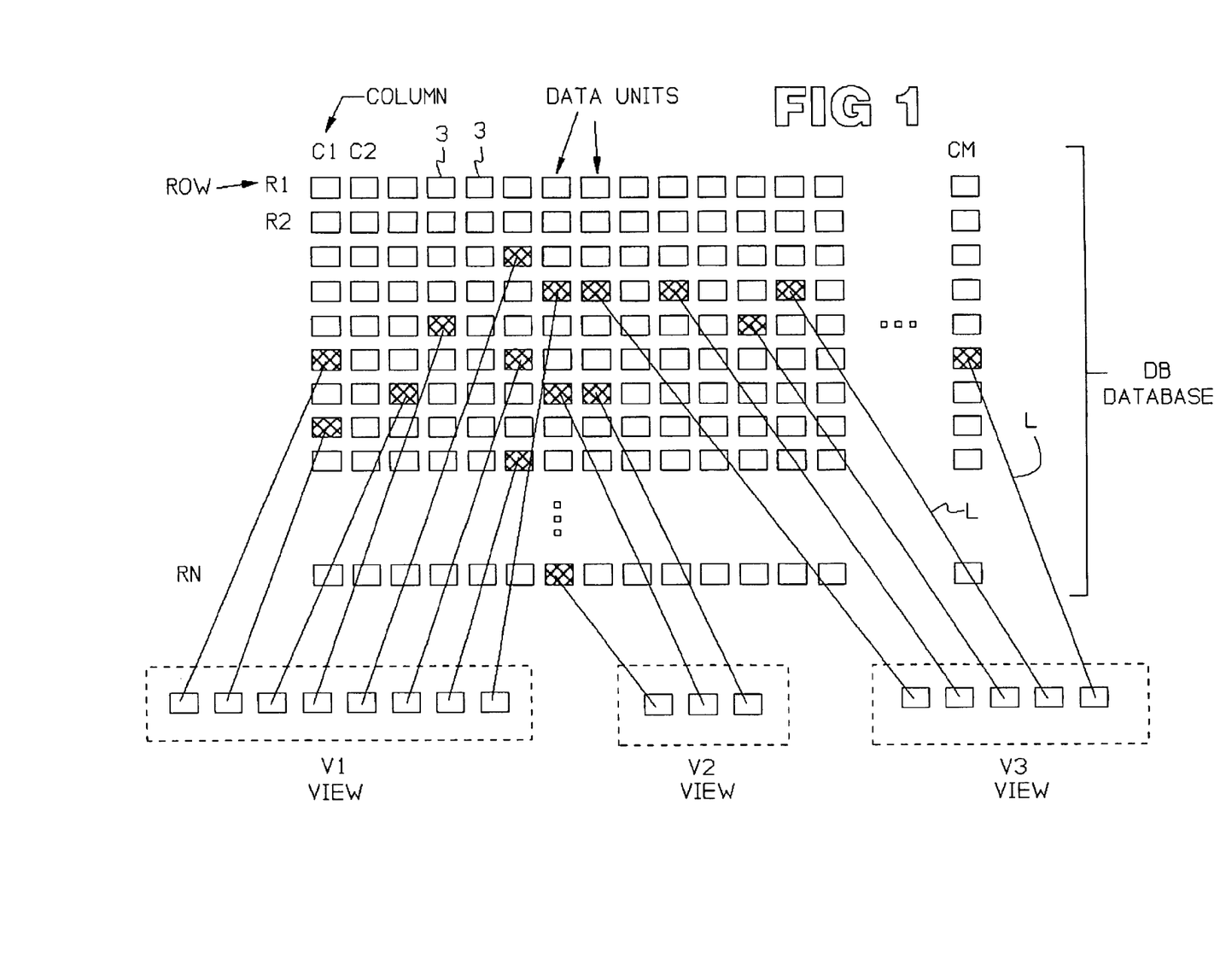
FIG. 1 is a generic illustration of a database, and also of views of the database.

FIG. 1 illustrates a database DB, which contains data units 3, which, for simplicity, are shown organized into rows R1, R2, RN and columns C1, C2, . . . CM. Users can query the database, by commanding a database management system to retrieve a specified collection of the data units.

For example, assume that the database is a nationwide telephone directory. A user may issue a query requesting retrieval of all telephone numbers assigned to parties named Miller, who live on Main Street, in all cities nationwide. The management system will return these telephone numbers to the user.

In many situations, it is convenient for users of the database DB to deal with a subset of the database, rather than with the database itself. Further, it also may be convenient for these subsets to be formatted differently, in order to suit the users' preferences.

These subsets are termed "views." Continuing the example given above, one view may contain all telephone data within the state of New Jersey. If the user issues the same query identified above, but to this view instead of to the database as-a-whole, only telephone numbers of parties in New Jersey would be retrieved.

Views are generated, or defined, through the use of queries. A view is either virtual or materialized. A virtual view is not physically stored as a subset of data in permanent storage, such as a fixed drive or tape. Rather, it is computed on demand by executing the query which generates the view, and the results of the query are stored in system memory.

In a materialized view, a query also generates, or defines, the view. However, unlike a virtual view, the results of the query which generates the materialized view are stored in permanent storage.

With the use of materialized views, multiple instances of a single piece of data can exist. For example, an original piece of data can exist in the database, and copies of that same data can exist in materialized views. If one of these instances of data changes, then a person reading two copies of the same underlying data may see different values of the data. For instance, in the example given above, if Miller's telephone number has changed, the person might see both Smith's current and previous phone number. In many situations, this inconsistency cannot be tolerated.

These inconsistencies can be caused by transactions which modify the database. A database transaction can be viewed as a series of commands starting with a "Begin-Transaction" command and completing with either an "AbortTransaction" or "CommitTransaction" command. An "AbortTransaction" command rolls back all work performed by the transaction, and returns the database to the condition prevailing prior to the "BeginTransaction" command. A "CommitTransaction" command causes the transaction to take effect, and makes the results of the transaction durable, by storing sufficient information on stable storage (e.g., disk) to ensure that none of the transaction's actions will be lost.

The data in the database is stored in the form of tuples. Before a transaction reads or writes a tuple, the appropriate read-or write-lock must be acquired. These locks prohibit other parties from gaining access to the locked data. This prohibition prevents the other parties from reading or modifying the data in manner different from the transaction's modifications, and thereby prevents inconsistencies from arising.

To perform any of these transactional tasks, the underlying database transaction manager must be invoked. Transaction managers having the capabilities described above are known in the art. However, existing managers, while preventing the inconsistencies described above from occurring in base data of the database itself, do not necessarily prevent inconsistencies from occurring in transactions which read materialized views of the database.

SUMMARY OF THE INVENTION

In one form of the invention, a database manager generates views. When a transaction seeks to issue a read-lock on a target tuple in a view, the invention attempts to lock a superset of tuples in the database. If certain conditions are met, the attempted lock succeeds.

The superset contains the tuples from which the target tuple is derived. Locking the superset prohibits changes in the superset-tuples, which may cause inconsistencies between the superset-tuples and the target tuple. However, the superset may also contain tuples which are not involved in deriving the target tuple, so that unrelated tuples may become locked. A trade-off occurs.

On the one hand, it is computationally expensive to identify a minimal set of tuples in the database from which the target tuple is derived, and lock only that minimal set. On the other hand, it is inexpensive to identify the superset. The disadvantage of locking the superset, including extra tuples, is seen as offset by the convenience in avoiding computation of the minimal set.

DETAILED DESCRIPTION OF THE INVENTION

Overview

The invention provides extensions to the capabilities of existing transaction managers, including three new routines for reducing inconsistencies which these managers can produce.

One routine eliminates inconsistencies entirely. The other two eliminate inconsistencies entirely if certain conditions hold. A particular transaction will either (1) use the conventional transaction manger, or (2) repeatedly use exactly one of these three extended routines, in the course of executing transactional tasks.

Preliminary Matters

Logic executed by the invention will be explained by reference to flow charts. In the flow charts, the symbol "T" and "Tm" refer to a transaction, which is a group of operations; "V" and "VS" refer to views; "U" refers to a base tuple, which is a tuple contained in a database, and which can be either written to, or read; "Tu" refers to a view tuple, which is a tuple contained in a view, and which can be read, but not written to, by database users.

Figure 3:
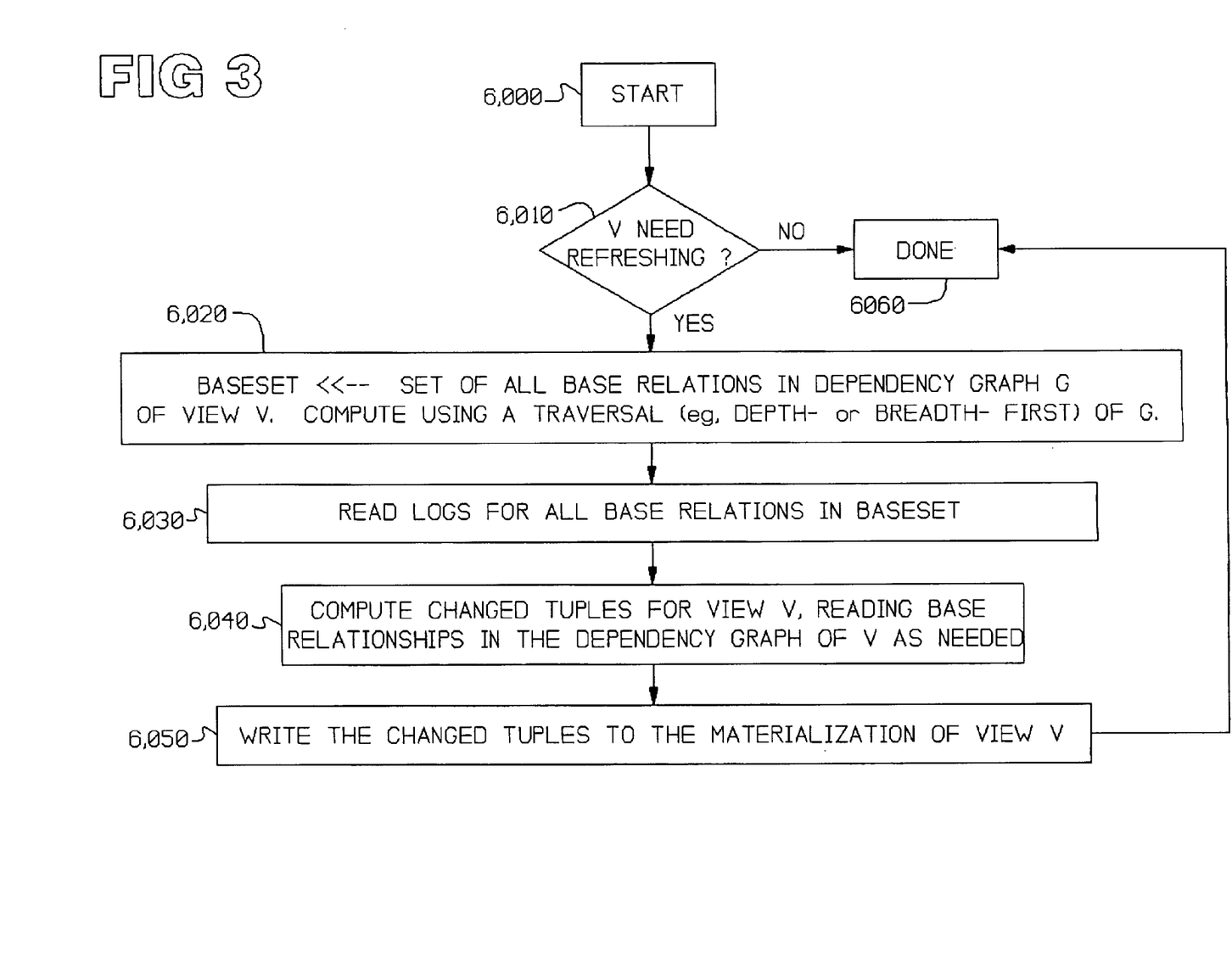
FIGS. 3–8 are flow charts illustrating logic implemented by the invention.

A materialized view tuple can be modified as part of maintenance to bring it up-to-date with the underlying base data. FIG. 3 is a flow chart describing how to maintain a view.

FIG. 3

Maintain View V, Which is Utilized in Transaction M

Input: View V

Output: Materialization of V will be made consistent with the Current State of the Base Tables from which V is Derived.

In FIG. 3, processing begins in block 6,000, which leads to block 6,010, which inquires whether view V requires refreshing. The inquiry is answered by interrogating the logs of the base relations over which V is defined. If no modifications have occurred to the underlying data in the base relations, V requires no refreshing. If modifications have occurred, the modifications may trigger the marking of V as requiring refreshing.

If refreshing is not required, then block 6,060 is reached, and the processing terminates. In this case, the view has been maintained, but not refreshed. A view is refreshed when maintenance must modify its contents.

Figure 2:
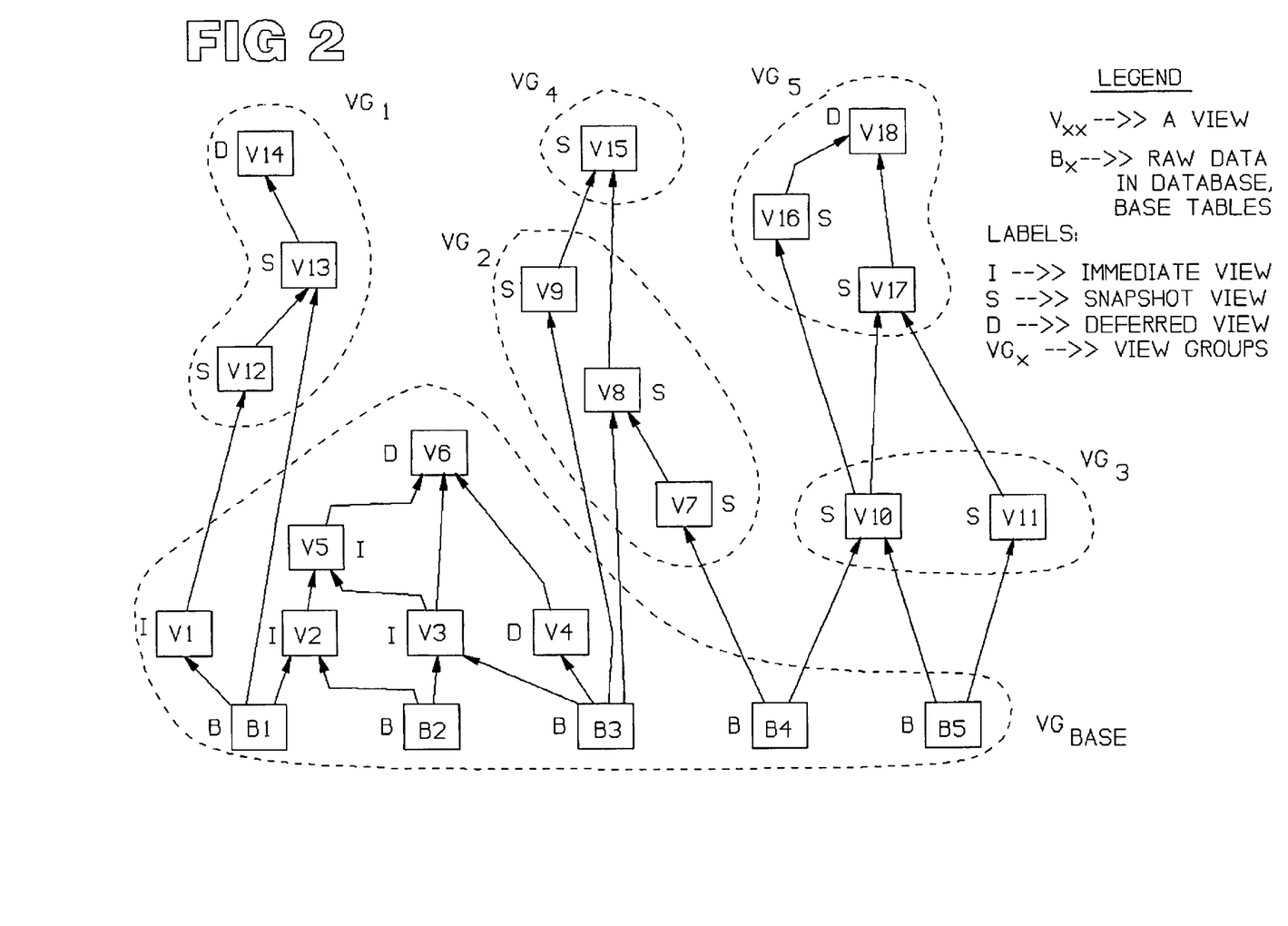
FIG. 2 illustrates a dependency graph used by the invention.

If refreshing is required, block 6,020 is reached, which places into a BASESET all base relations of the database which are needed to derive view V. These base relations are identified through a dependency graph G. FIG. 2 provides an example of a dependency graph. Items B1–B5 represent the raw data in the database, and will be called base tables herein.

View V1 is derived from a single source, namely, base table B1. However, view V10 is derived from two sources, namely, base tables B4 and B5. A preferred approach to identifying the base relations in the dependency graph is through use of a depth- or breadth-first traversal, as indicated in FIG. 3.

In effect, by using the dependency graph, block 6,020 identifies all relations, also called tables, needed to construct view V. These relations will be updated in later steps.

Next, block 6,030 is reached, which reads the logs for all base relations in the BASESET. Logs store information about changes made to the base relations. When a base relation's contents are changed, information about the changes are stored in a log for that relation. The logs allow previous states of the relation to be reconstructed, and are used, for example, if current relations becomes corrupted.

Block 6,030 reads the log entries for all base relations in the BASESET. That is, all log entries for all relations in the database which are necessary to produce view V are read (i.e., all relations that appear in the query that defines V). Within these relations, block 6,040 identifies the tuples which have changed for view V, using the dependency graph G. When the changed tuples have been identified, block 6,050 writes the changed tuples to the materialization of view V.

For maintenance purposes, the invention treats all views used in the definition of other views as virtual. Hence, the invention performs maintenance only in terms of the underlying base data. For instance, view V16 in FIG. 2 is maintained based on B4 and B5, not on view V10. Extensions to the algorithms to make use of the intermediate materialized views (e.g., view V10) are straightforward to those skilled in the art.

After block 6,050, block 6,060 is reached, ending the maintenance routine. The routine then returns to the point in the program which called the maintenance routine.

Figure 4:
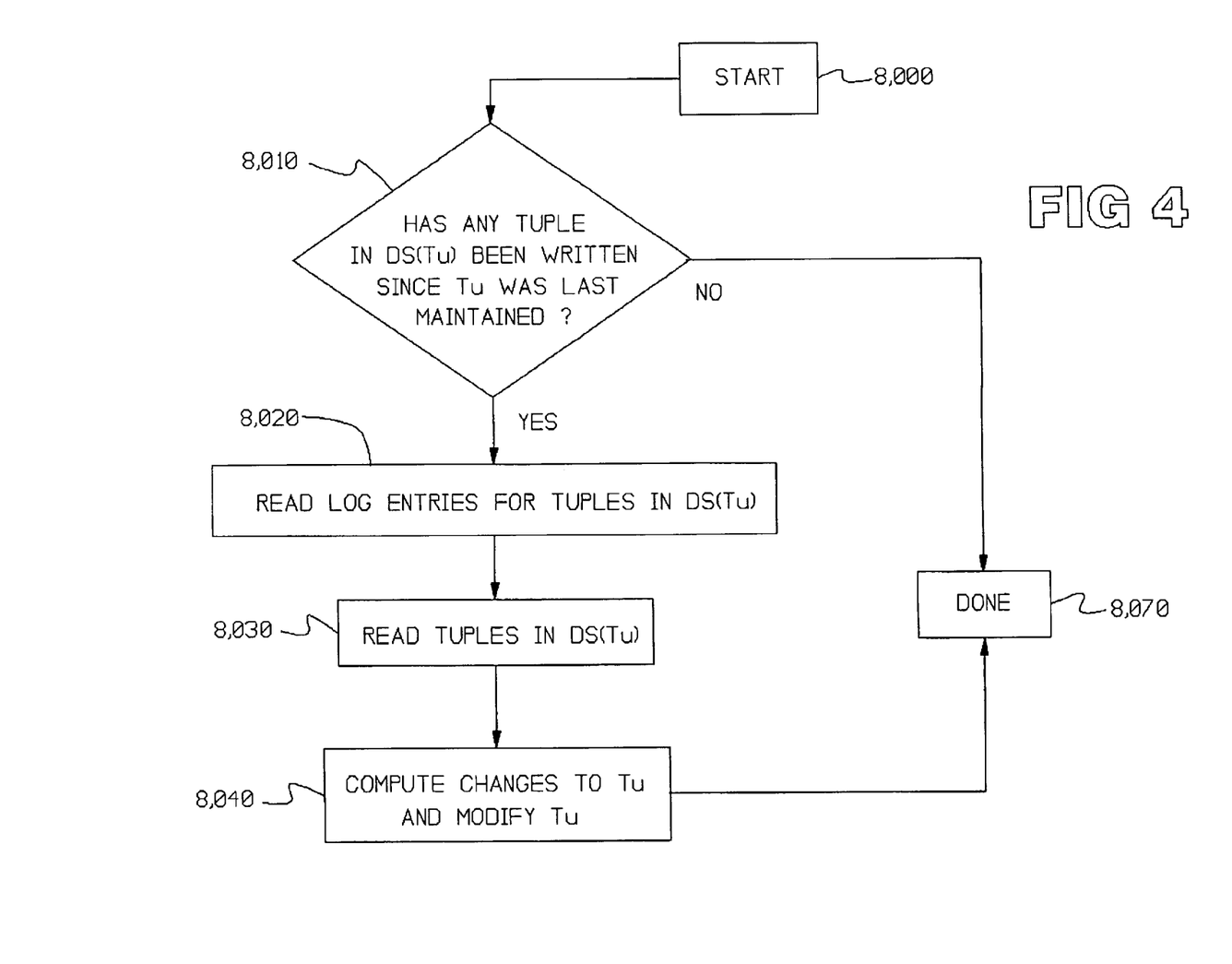

Therefore, in FIG. 3, view V is maintained and perhaps refreshed. FIG. 3 provides a maintenance routine for an entire view. FIG. 4 contains a routine to maintain a single tuple, Tu.

FIG. 4

Refresh Tuple(Tu)

INPUT: Tuple(Tu), from View V, which is to be Refreshed
OUTPUT: Refresh is Performed In FIG. 4, processing begins in block 8,000. Decision block 8,010 inquires whether any tuple in derivation set DS(Tu) has been written since Tu was last maintained. The derivation set DS(Tu) is the set of tuples in the base relations from which tuple Tu, in view V, is derived.

In practice, a superset of DS(Tu) is used which is easy to compute, rather than the exact set DS(Tu) which may be quite expensive to compute. For simplicity, the term "DS (Tu)" will be used to mean a particular superset of DS(Tu). A particularly simple-to-compute superset of DS(Tu) is the set of all tables mentioned in the query defining the view V which contains Tu.

Another algorithm for computing DS(Tu) is found in "Concurrency Control Theory for Deferred Materialized Views," by A. Kawaguchi, D. Lieuwen, I. Mumick, D. Quass, and K. Ross, in pp. 306–320 (esp. pages 312, 313) of "Database Theory—ICDT'97, 6th nternational Conference Proceedings," Delphi, Greece, January, 1997, published by Springer, Berlin, Lecture Notes in Computer Science 11-86.

If the answer is No, then block 8,070 is reached, and processing terminates. If the answer is Yes, then block 8,020 is reached, in which the log entries for the tuples in DS(Tu) are read from a log.

As explained above, log entries indicate the changes which have been made to an original base tuple. Block 8030 reads the tuples in DS(Tu). Block 8040, using the log entries of block 8020 and the tuples of block 8030, computes the changes made to the original tuple Tu, and modifies the original to reflect the changes. Now the original tuple Tu has been modified to be current. Processing terminates in block 8070.

Therefore, in FIG. 4, a tuple Tu in view V is updated to bring it up to date with changes to the underlying tuples in the base relations.

Figure 5:
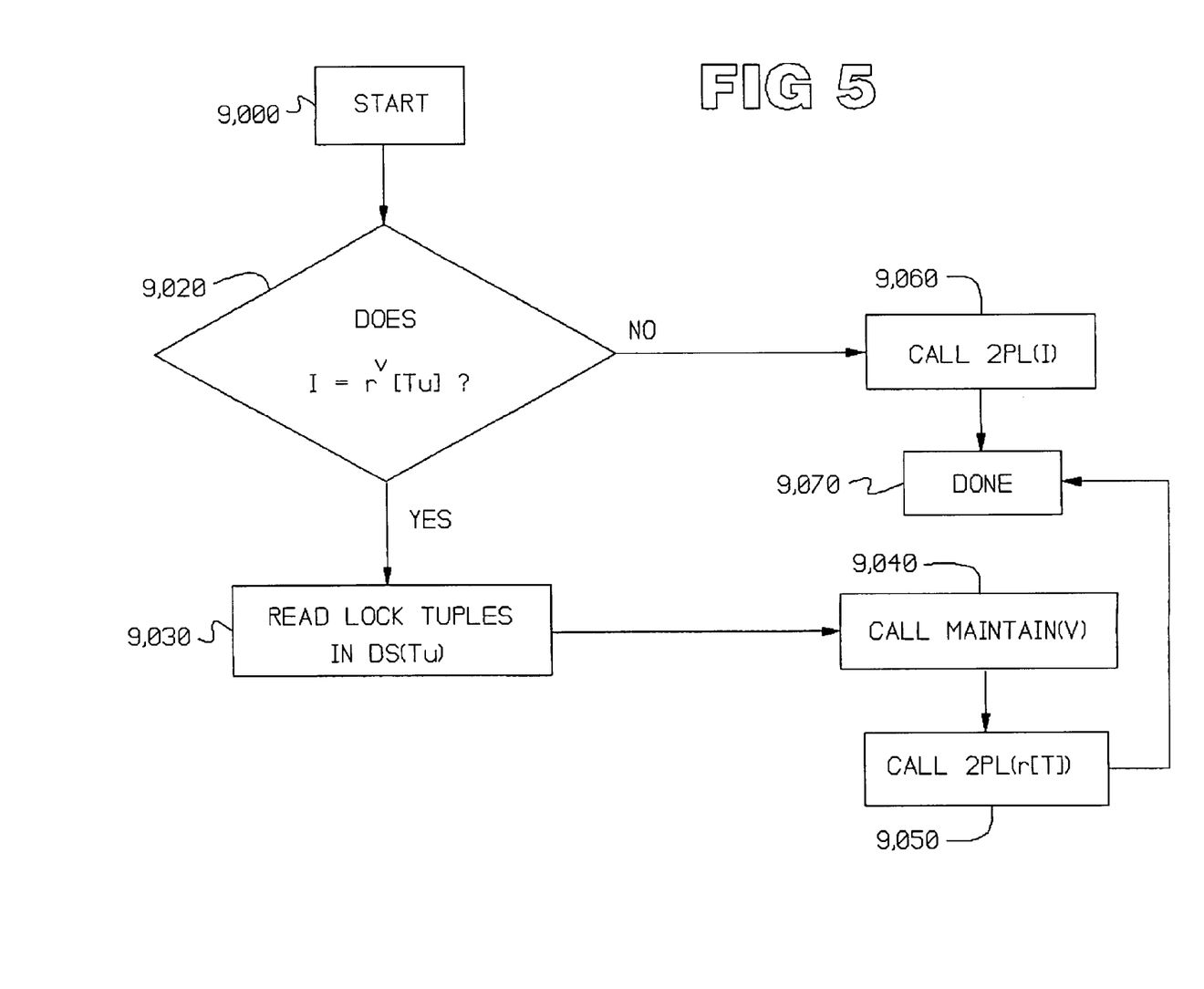

FIG. 5

Strict Currency Mat-Serializable 2PL Algorithm

INPUT: operation I {r[u], w[u], r'[Tu], BeginTransaction, CommitTransaction, AbortTransaction} of Transaction T, wherein:

r[u] requests a read lock on base tuple u;
w[u] requests a write lock on base tuple u;
$r^v$[Tu] requests a read lock on a view tuple Tu from view V.

OUTPUT: Wait-or-Proceed Decision, so that 2PL Schedules with Strict Currency are Produced.

All operations except r'(Tu) are standard operations supported by the locking subsystem of any transaction manager supporting two-phase locking. Two-phase locking is known in the art. An extensive treatment of how to build the mechanisms underlying two-phase locking can be found in Jim Gray and Andreas Reuter, Transaction Processing: Concepts and Techniques, 2nd printing, Morgan Kaufmann, 1993.

The invention builds a locking protocol on top of a known transaction manager which properly handles views. The Specification will describe this by making reference to the 2PL routine called in the flow charts of FIG. 5 and others.

The underlying transaction management machinery knows nothing of views. Hence, it will treat a view tuple just like a base tuple in terms of locking. This leads to inconsistencies if additional machinery is not employed. However, it also means that the machinery can be used to lock view tuples to prevent other transactions from reading the maintained tuples until the transaction that does the maintenance completes.

In brief, two-phase locking entails two phases: a growing phase, and a shrinking phase. The growing phase exists while an transaction is requesting that locks be granted. However, once the transaction releases one, or more, locks, the shrinking phase begins. During the shrinking phase, no further locks can be acquired by the transaction.

In FIG. 5, processing begins in block 9000. Block 9020 inquires whether the operation I requests a read lock on a view tuple "Tu," which is a tuple belonging to view V. If not, block 9060 is reached, and the underlying 2PL machinery of the transaction manager is used to execute the conventional request, and processing completes in block 9,070. If, in block 9020, the read lock is requested, block 9030 is reached, which obtains a read lock on the tuples in the derivation set of tuple Tu. As explained above, the derivation set DS(Tu) is the set of tuples in the base relations from which tuple Tu is derived.

Next, block 9040 calls the routine MAINTAIN(V), which was described in connection with FIG. 3. Alternatively, the process RefreshTuple(Tu) in FIG. 4 could be used.

Optimizations are possible. For example, if the transaction has already performed MAINTAIN(V) and has not modified any tuples of the base relations used in the definition of V, then the transaction need not re-execute MAINTAIN(V). Similar optimizations will be readily apparent to those skilled in the art.

Block 9050 requests a read lock from the underlying storage manager for the view tuple Tu. The underlying storage manager is not aware that Tu is anything more than a standard tuple, and so it can lock Tu using normal procedures. To guarantee consistency, both the locks on DS(Tu) and on Tu are required. Processing terminates in block 9070.

Figure 6:
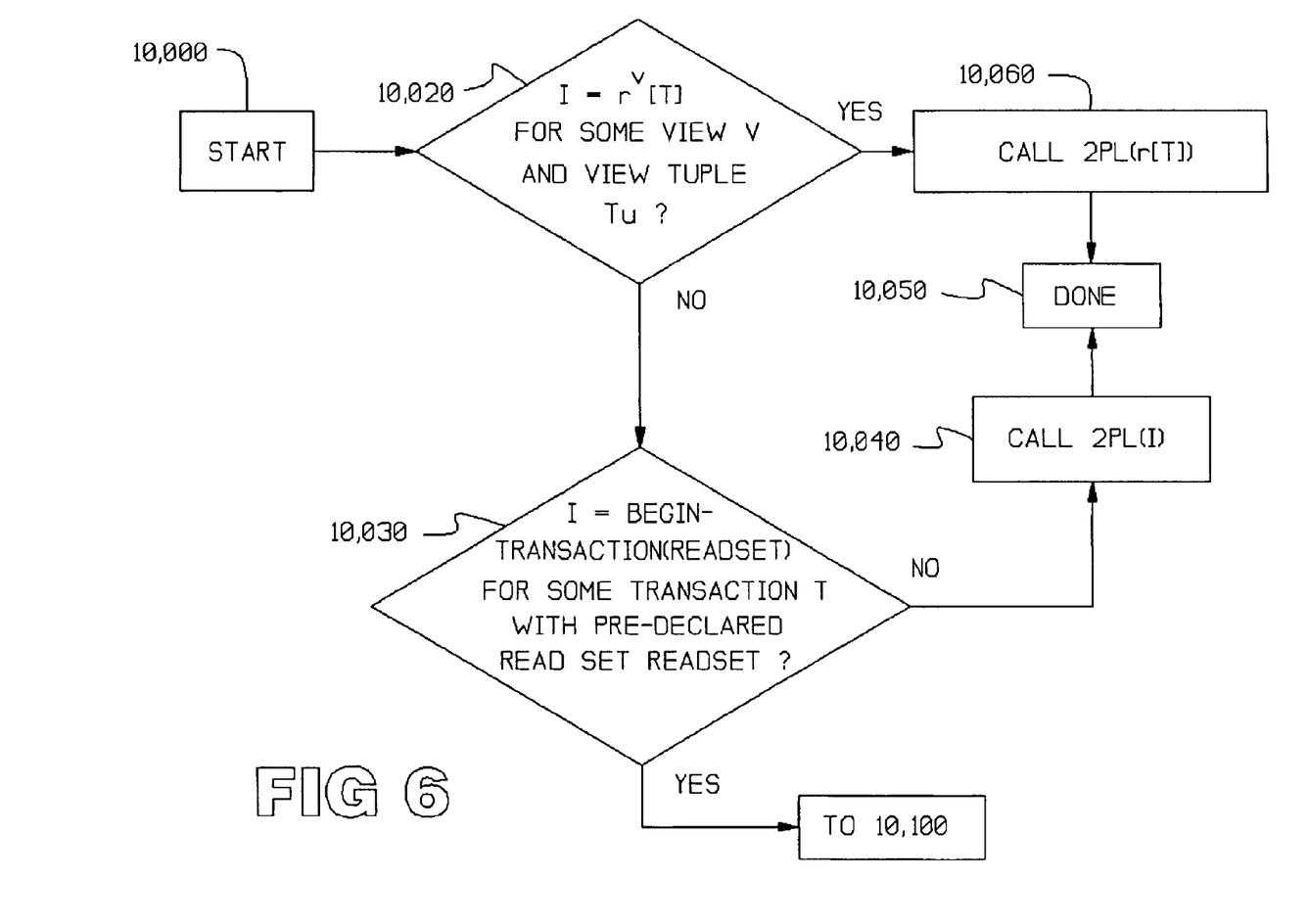
Figure 7:
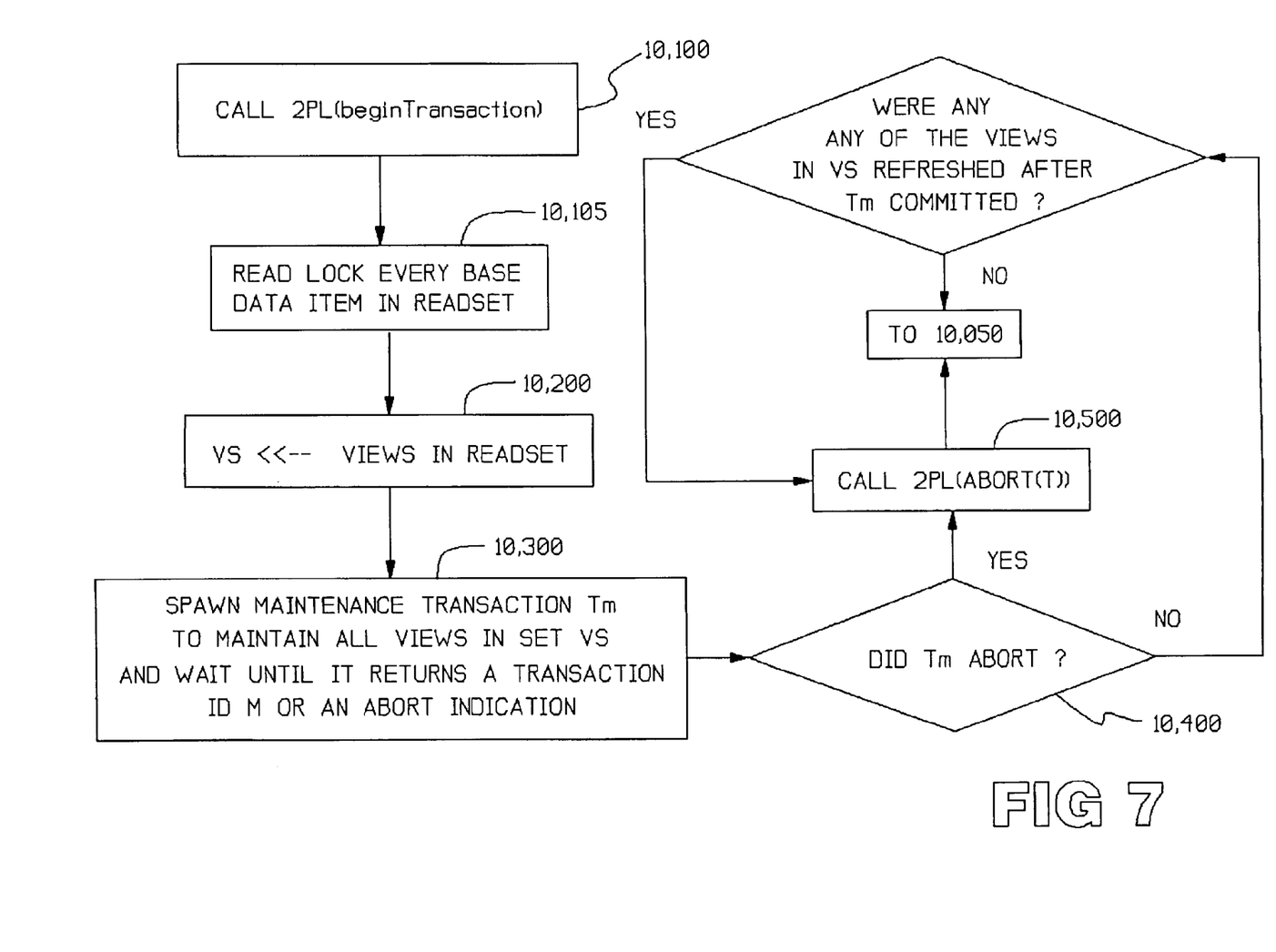

FIGS. 6 and 7

Loose Currency Mat-Serializable 2PL Algorithm

INPUT: Operation I BeginTransaction(ReadSet), r[u], w[u], r'[Tu], AbortTransaction, CommitTransactiony of Transaction T, wherein:

r[u], w[u], and r'[Tu] are defined in the previous section; and

BeginTransaction(ReadSet) requests initiation of transaction T which has a read set named ReadSet, which contains all the base tuples (or relations) and views to be read by the transaction.

OUTPUT: Wait, Proceed, or Abort Decision, so that 2PL Schedules with Loose Currency are Produced. Views in ReadSet are maintained.

In FIG. 6, processing begins in block 10,000. Decision block 10,020 is reached, which inquires whether operation I requests a read lock on a view tuple "Tu," which is a tuple belonging to view V. If so, block 10,060 calls a 2PL routine requesting a lock on Tu (where 2PL treats the view tuple Tu like a standard base relation tuple). Processing terminates in block 10,050.

If the NO branch is taken from block 10,020, then decision block 10,030 is reached. This block inquires whether operation I is the beginning operation in a transaction T, wherein transaction T contains a pre-declared read set, named ReadSet. If not, processing proceeds to block 10,040 and the underlying transaction manager handles the total request. Processing terminates in block 10,050.

If operation I does represent the beginning of such a transaction T, then block 10,100 in FIG. 7 is reached. The underlying transaction manager is used to start a transaction. Then, block 10,105 is reached. For the transaction T started in block 10,100, the pre-declaration of the read set, named ReadSet, acts as a request for a lock on all entities from base relations listed in ReadSet.

The pre-declaration of the read set also acts as a request for maintenance of all views in ReadSet. Consequently, special operations must be undertaken in order to handle transaction T. In block 10,105, a read lock is imposed on every base data item listed in the read set. The locks are acquired using the underlying 2PL routine used elsewhere (e.g., block 10,040). The term "base data item" refers to data items within the base relations, as opposed to items in views.

Next, block 10,200 assigns to a variable VS the set of views in ReadSet. Then, block 10,300 spawns, or launches, a maintenance transaction Tm. The maintenance transaction Tm maintains all views in set VS, using the maintain routine of FIG. 3. After completing, Tm returns its transaction identifier, M, or an abort indication.

If, in decision block 10,400, maintenance transaction Tm aborted, then block 10,500 is reached, which calls a 2PL abort routine which operates on transaction T. This 2PL routine restores the status quo to the system, returning the system to its condition prior to initiation of transaction T, since T has been aborted. Then, as indicated, block 10,050 is reached.

If maintenance transaction Tm does not abort, then, in block 10,600, a check is made to see if any of the views in VS were refreshed after Tm committed. In order to allow this check, the transaction identifier of the last transaction to refresh a view V is stored in the database, or in some other place, such as a server in the network.

Some system, such as the database or a server, also keeps track of the sequence of transaction commits. If any of the views were refreshed after Tm committed, block 10,500 is reached, and the transaction T aborts. Transaction T is aborted because, if the views were maintained at different times, the possibility of inconsistency exists.

Another maintainer has refreshed at least one view after Tm completed. Continuing might lead to inconsistent results.

As one summary of the preceding: the logic of FIGS. 6 and 7 inquires whether operation I wishes to begin a new transaction with a pre-declared read set. If so, maintenance transaction Tm is launched to maintain all views in the set VS. Next, inquiry is made whether all views in VS have been maintained at the same time. If so, processing completes. If not, the newly started transaction T is aborted, because of the possibility of inconsistent data within the views. Lock requests, commit, and abort are passed to the underlying transaction manager for handling.

Figure 8:
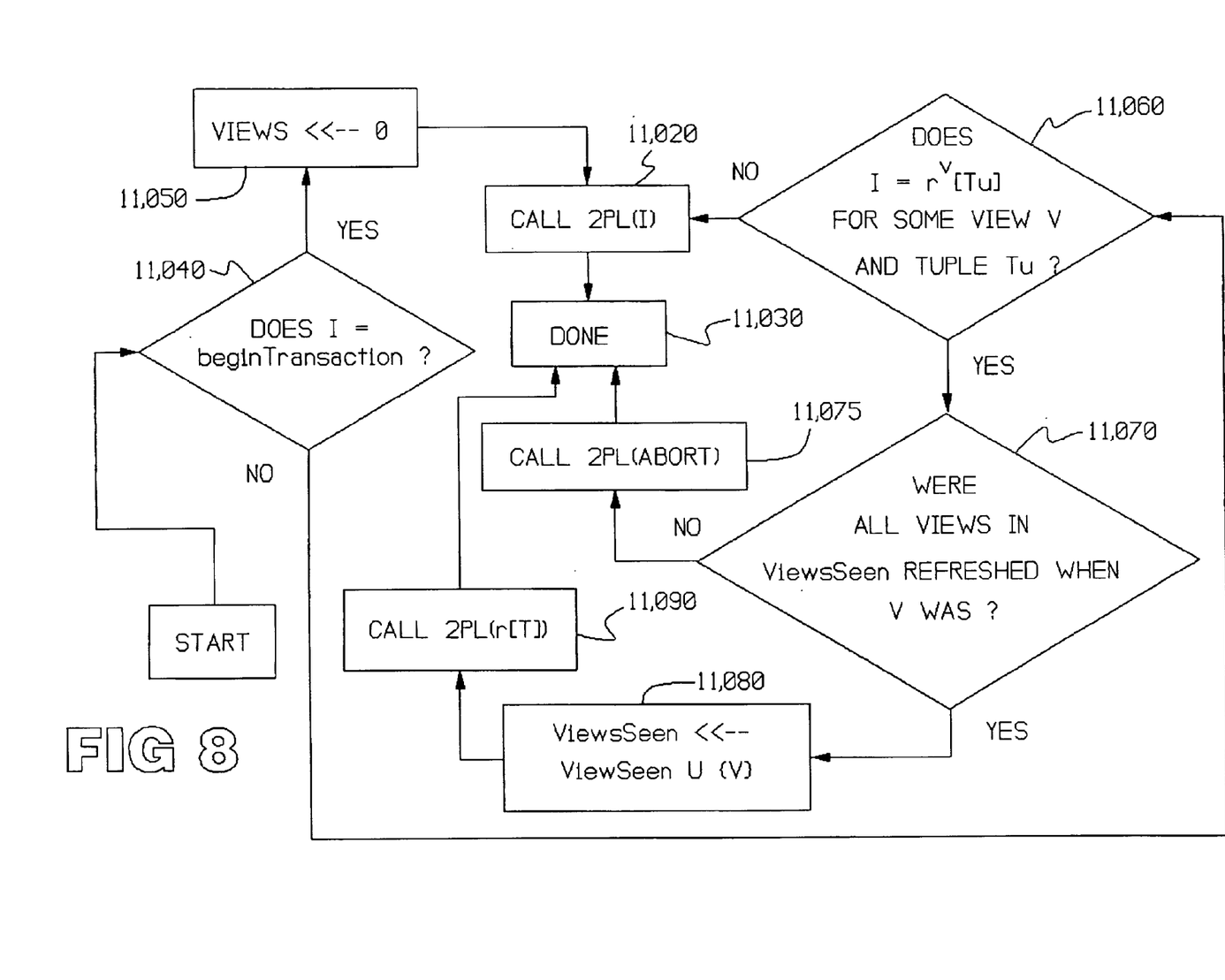

FIG. 8

Periodic Concurrency

INPUT: Operation I (BeginTransaction, AbortTransaction, CommitTransaction, r[u], w[u], r'[Tu]) of Transaction T, wherein:

r[u], w[u], and r'[Tu] are defined in the previous section.

OUTPUT: Wait, Proceed, or Abort Decision, so that 2PL Schedules with Periodic Currency are Produced. Views in ReadSet are maintained.

In FIG. 8, decision block 11,040 inquires whether operation I represents the beginning of a transaction Tr. If so, block 11,050 sets an indicator variable ViewsSeen to the empty set. ViewSeen is the set of all views seen in the current transaction. Future calls to this routine to lock view tuples will make use of this set. This indicator variable is used later to detect the occurrence of an event of interest, as will be seen.

If operation I does not represent the beginning of transaction Tr, then, by inference, operation I is not the beginning step of a set of operations, but one of the operations themselves. Decision block 11,060 is reached, which inquires whether operation I requests a read lock on a tuple Tu of view V. If not, block 11,020 is reached, and the underlying transaction manager is handed the request I for processing. Processing completes in block 11,030. If operation I requested a read lock on tuple Tu of View V, block 10,070 is reached.

Block 11,070 inquires whether V was refreshed at a different time than any of the other views seen by the current transaction. If so, block 11,075 is reached and the transaction is aborted. Otherwise, inconsistent data may be seen. If not, then transactionally consistent views have been seen thus far.

The current view is added to the set of views seen thus far by the transaction in block 11,080. Block 11,090 acquires a read lock from the underlying transaction manager. Processing terminates at block 11,030.

Figure 9:
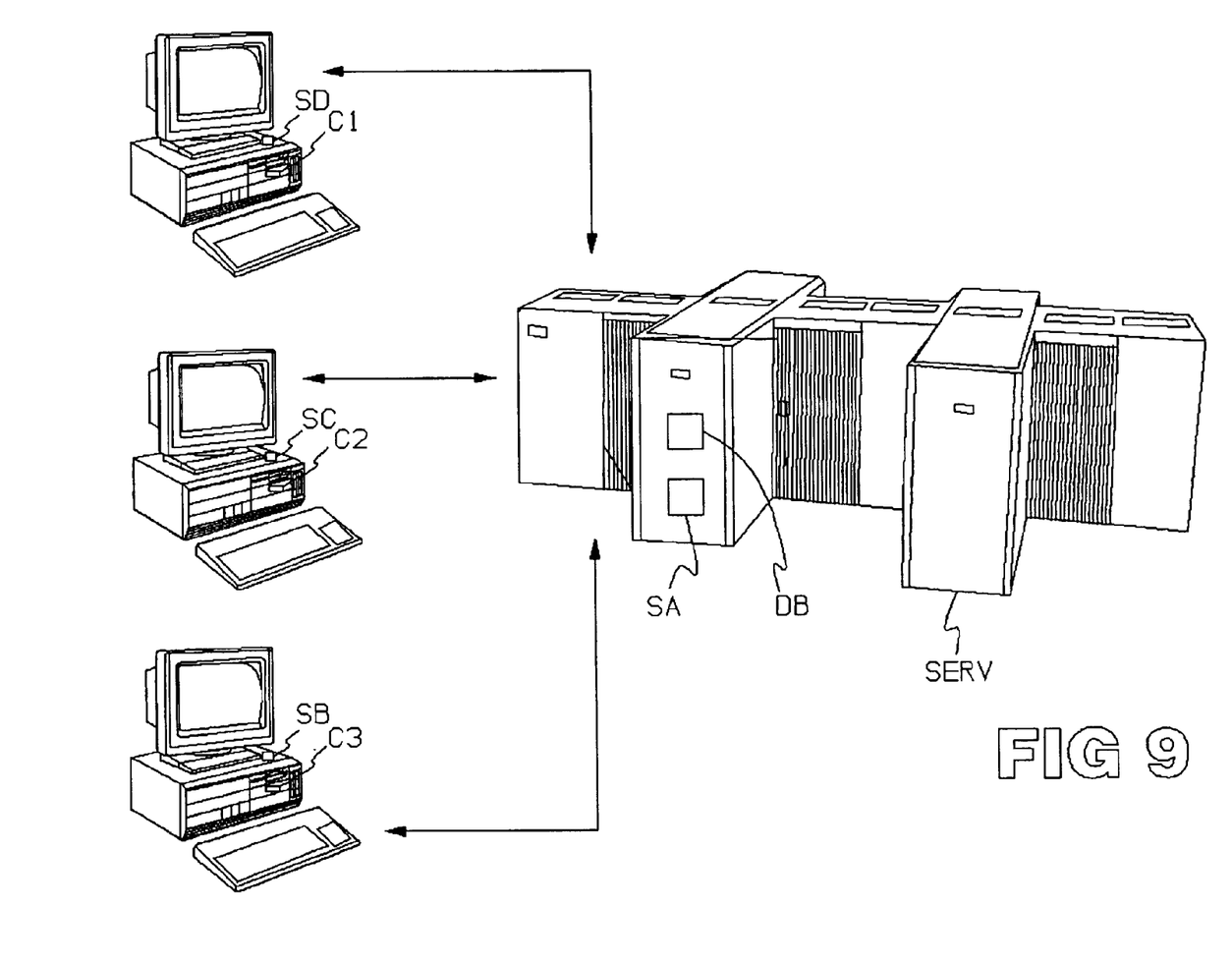
FIG. 9 illustrates one form of the invention.

FIG. 9

FIG. 9 illustrates (1) a server SERV, which may take the form of a complex of distributed servers, and (2) individual computers, or terminals, C1–C3, which are linkable to the server, as indicated by the double-ended arrows. The server contains database DB. Software, indicated by modules SA, SB, SC, and SD, individually and collectively, execute the logic described in the flowcharts contained in this Specification. The software indicated also represents the database management system described above, which generates views.

Numerous substitutions and modifications can be undertaken without departing from the true spirit and scope of the invention. What is desired to be secured as Letters Patent is the invention as defined in the following claims.

What is claimed is:

1. A system, comprising:

a database;

means for generating views of the database, said views containing view tuples; and means for detecting issuance of a read-lock-request for a target view tuple and, in response, locking tuples in the database which include a superset of tuples from which the target view tuple is derived;

wherein the members of the superset are ascertained using a dependency graph between the view containing the target view tuple and the base data.

2. System according to claim 1, wherein the superset is limited to a derivation set of the target view tuple.

3. System according to claim 1, wherein a transaction T issues the read-lock-request and, prior to the issuance, the transaction T declares a read set which contains all data to be read by transaction T.

4. System according to claim 3, wherein the transaction T locks a subset of the read set before processing operations in the transaction T.

5. System according to claim 4, wherein the subset contains all base data members of the read set.

6. System according to claim 3, wherein the transaction T initiates an independent maintenance transaction Tm to maintain a set of views in the read set.

7. System according to claim 6, wherein the set of views contains all view members of the read set.

8. System according to claim 6, and further comprising means for aborting the transaction T if the maintenance transaction Tm is aborted.

9. System according to claim 6, and further comprising means for aborting the transaction T if refreshing of any views in the read set occurs after the transaction Tm commits and before the transaction T commits.

10. A method of handling a database, comprising the following steps:

generating views of the database, said views containing view tuples; and detecting issuance of a read-lock-request for a target view tuple and, in response, locking tuples in the database which include a superset of tuples from which the target view tuple is derived;

wherein the members of the superset are ascertained using a dependency graph between the view containing the target view tuple and the base data.

11. Method according to claim 10, wherein the superset is limited to a derivation set of the target view tuple.

12. Method according to claim 10, wherein a transaction T issues the read-lock-request and, prior to the issuance, the transaction T declares a read set which contains all data to be read by transaction T.

13. Method according to claim 12, wherein the transaction T locks a subset of the read set before processing operations in the transaction T.

14. Method according to claim 13, wherein the subset contains all base data members of the read set.

15. Method according to claim 12, wherein the transaction T initiates an independent maintenance transaction Tm to maintain a set of views in the read set.

16. Method according to claim 15, wherein the set of views contains all view members of the read set.

17. Method according to claim 15, and further comprising the step of aborting the transaction T if the maintenance transaction Tm is aborted.

18. Method according to claim 15, and further comprising the step of aborting the transaction T if refreshing of any views in the read set occurs after the transaction Tm commits and before the transaction T commits.

* * * * *